(12) United States Patent
Holt

(10) Patent No.: US 6,632,352 B2
(45) Date of Patent: Oct. 14, 2003

(54) MULTI-STAGE FILTER

(75) Inventor: Andrew J. Holt, Des Moines, IA (US)

(73) Assignee: Nursery Pro, Inc., Batavia, IL (US)

( * ) Notice: Subject to any disclaimer, the term of this patent is extended or adjusted under 35 U.S.C. 154(b) by 63 days.

(21) Appl. No.: 09/903,015

(22) Filed: Jul. 11, 2001

(65) Prior Publication Data

US 2003/0010694 A1 Jan. 16, 2003

(51) Int. Cl.$^7$ .................. B01D 29/46; B01D 29/54; B01D 29/56
(52) U.S. Cl. .................. 210/184; 210/185; 210/232; 210/416.1; 210/488; 210/512.1; 210/748
(58) Field of Search ................. 210/184, 185, 210/232, 282, 283, 284, 288, 290, 416.1, 748, 512.1, 483, 484, 488, 489; 55/482, 482.1, 485, 487, 443

(56) References Cited

U.S. PATENT DOCUMENTS

| 2,027,876 | A | * | 1/1936 | Pennebaker ............... 210/183 |
| 2,302,489 | A | * | 11/1942 | Brown ..................... 196/46.1 |
| 2,392,901 | A | * | 1/1946 | Brown ..................... 210/416.5 |
| 3,505,794 | A | * | 4/1970 | Nutter et al. ............... 55/487 |
| 3,675,776 | A | * | 7/1972 | Campo ..................... 210/232 |
| 3,947,364 | A | | 3/1976 | Laval |
| 4,032,457 | A | * | 6/1977 | Matchett ................... 210/489 |
| 4,033,877 | A | | 7/1977 | Klepp et al. |
| 4,187,136 | A | | 2/1980 | Nostrand |
| 4,299,699 | A | * | 11/1981 | Boogay ..................... 210/143 |
| 4,596,586 | A | | 6/1986 | Davies et al. |
| 4,726,902 | A | | 2/1988 | Hubbard |
| 4,950,400 | A | * | 8/1990 | Girondi .................... 210/335 |
| 5,084,166 | A | * | 1/1992 | Shiraga et al. ............. 210/172 |
| 5,098,585 | A | * | 3/1992 | Woltman et al. ............ 210/778 |
| 5,145,494 | A | * | 9/1992 | Sowinski ................... 95/142 |
| D337,167 | S | | 7/1993 | Soderlund et al. |
| 5,300,222 | A | | 4/1994 | Broussard |
| 5,305,794 | A | * | 4/1994 | George ..................... 137/614.2 |
| 5,690,824 | A | * | 11/1997 | Stuth ....................... 210/333.01 |
| 5,961,678 | A | * | 10/1999 | Pruette et al. ............. 55/485 |
| 6,019,809 | A | * | 2/2000 | Kahlbaugh et al. .......... 55/486 |
| 6,071,095 | A | | 6/2000 | Verkaart |
| 6,119,870 | A | | 9/2000 | Maciejewski et al. |
| 6,383,383 | B1 | * | 5/2002 | Novak ..................... 210/304 |

FOREIGN PATENT DOCUMENTS

| DE | 200 06 981 U | 6/2000 |
| EP | 0 341 349 A | 11/1989 |
| EP | 0 899 237 A | 3/1999 |
| EP | 1 068 888 A | 1/2001 |
| WO | WO 00 59603 A | 10/2000 |

* cited by examiner

Primary Examiner—Fred G. Prince
(74) Attorney, Agent, or Firm—Gerald S. Geren; Barnes & Thornburg

(57) ABSTRACT

The present invention provides a convenient way to filter water in a body of water. The invention combines an encloseable container with an internal pump producing cyclonic action, with two different types of filters. One type of filtering consists of layers of varied porosity, one layer filtering only very fine debris, while the other layers blocking progressively large debris. The other type of filtering involves stacked discs placed to aid in further filtering of the water in the chamber of the cylinder. Water flows around the bottom disc, through holes in the second disc, and around the third disc before approaching the stacked filters of varied porosity. An internal ultra-violet light helps control algae in the water.

16 Claims, 2 Drawing Sheets

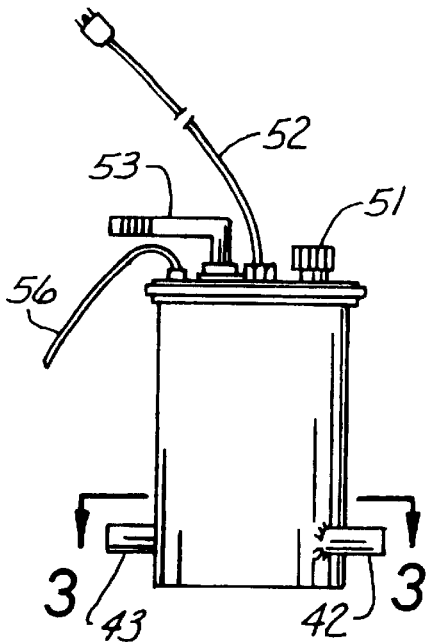
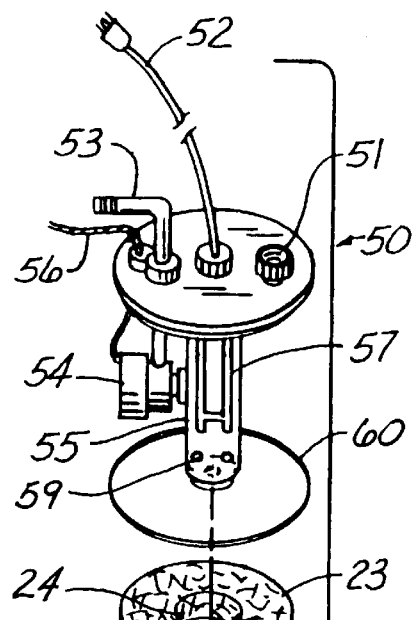
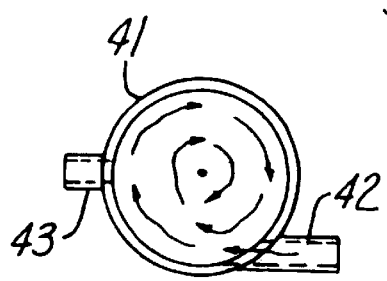
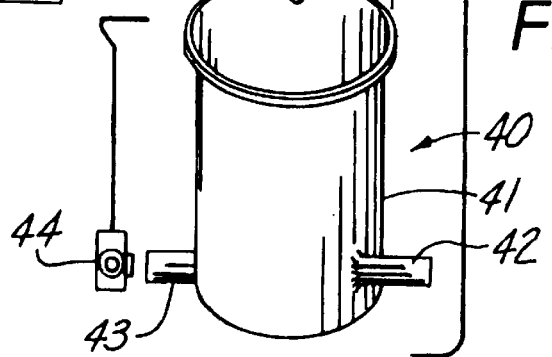
Fig. 1
Fig. 2
Fig. 3

MULTI-STAGE FILTER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

This present invention relates to the field of water filtration devices, and more particularly to water filtration devices using vacuum and cyclonic filtration techniques.

2. Description of the Related Art

Water filtration devices are well known in the art. Typical water filtration devices use varied filtration techniques to remove impurities from water. Typical water filtration devices do not combine vacuum containers, multi-layered cyclonic filtration, and ultra-violet algae control in a single water filtration device.

As can be seen by reference to the following U.S. Pat. No. 5,300,222, "Water Clarification Method And Apparatus", and U.S. Pat. No. 3,947,364, "Apparatus For Removing Particles From Fluid", the prior art is replete with myriad and diverse water filtration devices.

U.S. Pat. No. 5,300,222, titled "Water Clarification Method And Apparatus" contains a pump powered cyclonic water filtration device. However, the aforesaid invention does not provide for a pump inside the device itself, as provided in the present invention. In addition, U.S. Pat. No. 3,947,364 provides for a cyclonic filtration device. However, the aforesaid patent also does not provide a pump internal to the invention as provided by the present invention.

While all of the aforementioned prior art constructions are more than adequate for the basic purpose and function for which they have been specifically designed, they are uniformly deficient with respect to their failure to provide a simple, efficient, and practical water filtration system with an internal pump, combining multi-layered cyclonic filtration, and ultra-violet algae control in a single water filtration device.

As a consequence of the foregoing situation, there has existed a longstanding need for a new and improved water filtration device for filtering of water, and the provision of such a construction is a stated objective of the present invention.

BRIEF SUMMARY OF THE INVENTION

Briefly stated, a preferred embodiment of the present invention is a multi-stage filter for clarifying a contaminated fluid comprising a container surrounding a chamber with at least one outlet and at least one inlet, a water pump, an ultra-violet light for controlling algae, a plurality of filters inside the chamber with varied degrees of porosity to remove various sizes of material from water flowing through the container, and a plurality of discs inside the chamber for further filtering water inside the chamber.

When the pump is turned on, water flows from a body of water being filtered into the container. The water proceeds around the bottom disc, through the holes in the second discs, and around the third disc. The water flows toward the filter closest to the conduit opening, and when the outer edge of the filter becomes clogged, the water passes around to the next filter and back down to an opening in the conduit. The water proceeds through the conduit to the pump and out the outlet back into the body of water being filtered.

In a preferred embodiment of the invention, the filters are constructed from a foam material. The discs may be constructed from a substance such as a rigid metallic material. The multi-stage filter contains an optional heater to heat water flowing through the shell. The multi-stage filter contains a back wash valve such as a knife valve to purge concentrated waste debris from the container. The container contains a port to connect to a garden hose for backwashing the filters. The filters contain an interior hole, and are disposed in the container with the conduit protruding through the filter holes. The filters are stacked upon each other, and are attached to the container above the discs.

BRIEF DESCRIPTION OF THE SEVERAL VIEWS OF THE DRAWING

These and other attributes of the invention will become more clear upon a thorough study of the following description of the best mode for carrying out the invention, particularly when reviewed in conjunction with the drawings, wherein:

FIG. 1 contains a side elevational view of an embodiment of the present invention.

FIG. 2 contains an exploded perspective view of an embodiment of the present invention with the interior parts removed.

FIG. 3 contains a cross sectional view taken along line 3—3 of an embodiment of the present invention showing the cyclonic action of the liquid inside of the container by the arrows.

DETAILED DESCRIPTION OF THE BEST MODE

Figure 4:
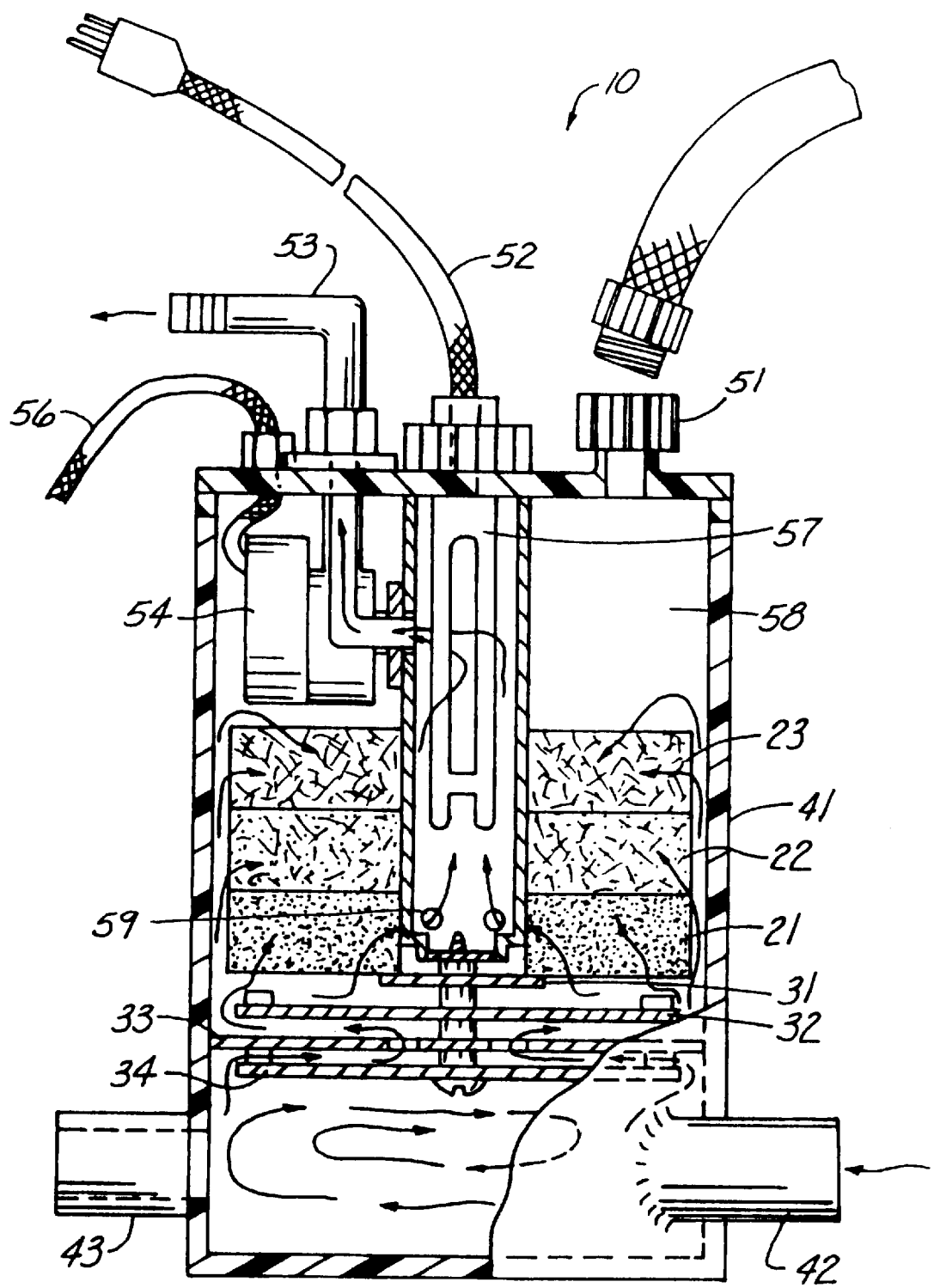
FIG. 4 contains a side elevational view of an embodiment of the present invention with most of the front sidewall removed to show the inside thereof.

As can be seen by reference to the drawings, and particularly to FIG. 1, the multi-state filter that forms a preferred embodiment of the present invention is designated generally by the reference number 10. As seen in FIG. 4, a preferred embodiment of the present invention 10 is comprised of a container 41 surrounding a chamber 58, with a removable lid 50 disposed on the top of the container 41. A conduit 55 is attached to the central area of the lid 50. A water pump 54 is disposed such that water in the container 41 is flowable from the conduit 55, through the pump 54, and out through an outlet 53 in the lid 50. The element 57 is either an ultra-violet light or a water heater that is installable into the conduit 55, the water heater 57 being needed when temperatures are below freezing and the ultra-violet light 57 being used at other times.

As best seen in FIG. 2, multiple layers of filters 20 are attached inside the container 41 with varied degrees of porosity for removing various sizes of material from water flowing through the container 41. The filters 20 are stacked upon each other and surround a portion of the conduit 55 such that the filters 20 surround the openings 59 in the conduit 55. The filters 20 may or may not completely encircle the conduit 55. In one embodiment, the filters 20 contain an interior opening 24 through which the conduit 55 is placed. The filters 20 rest upon a plate 31 secured to the conduit 55 by bolts 37.

As seen in FIG. 2, Multiple layers of discs 30 are attached to the bottom of the conduit 55 inside the container 41. The bottom disc 34 is smaller in size than the container 41 and is disposed such that water from the inlet 42 flows around the outer edge of the bottom disc 34. A second disc 33 is disposed above the bottom disc 34 with spacers 36 and is the same size as the container 41 such that water will not flow around the outer edge of the second disc 33, but only through openings 35 in the second disc 33. A third disc 32 is smaller in size than the container 41 and is disposed above the second disc 33 with a spacer 36. The third disc 32 is disposed such that water flows from the second disc 33 around the outer edge of the third disc 32. A plate 31 is spaced above the third disc 32 and rests against the bottom of the conduit 55. A bolt 37 is disposed through the spacers 36 and secured to the bottom of the conduit 55.

As seen in FIGS. 2, 4, the container 41 contains an inlet port 42 for the input of unfiltered water. The container 41 contains an outlet port 53 for the output of filtered water. The multi-stage filter 10 contains a back wash valve 43 such as a knife valve 44 to purge concentrated waste debris from the container 41. The container 41 contains a port 51 for connecting to a garden hose for backwashing the filters and flushing the container 41. The lid 50 of the container 41 is attachable to an O-Ring 60 to secure the lid 50 in the closed position.

In use, a preferred embodiment of the present invention 10 is placed near a body of water that is desired to be filtered such as a pond or a pool. The multi-stage filter 10 is connected to an electric power source by plugging in its power cords 52,56 into an electric outlet. As shown in FIG. 3, the pump 54 draws water out of the body of water, and the water enters the container 41 at the inlet 42 at an angle such that the water moves in a substantially circular manner. As seen in FIGS. 2, 4, the water is drawn by the pump 54 around the outer edge of the bottom disc 34, through the holes 35 in the second disc 33, and around the edge of the third disc 32. The discs 30 filter debris too large to fit through the holes 35 in the second disc 33 or between the spacers 36 between the discs 30. The water then is drawn towards the central conduit 55 by vacuum pressure created by the pump 54. The water is drawn first to the bottom filter 21, which is closest to the conduit 55. As the outer edge of the filter 21 begins to clog up with debris, the water circles around the filter 21, and proceeds through unclogged filters 22, 23 above the bottom filter 21. Water is drawn through the filters 20 into openings 59 in the conduit 55. The water then proceeds through the pump 54 and out the outlet 53 back into the body of water being filtered.

The container 41 and filters 21, 22, and 23 can be cleaned by opening the back wash valve 43 to let out collected debris from the bottom of the container 41. In addition, a port 51 attached to the lid 50 is attachable to a garden hose 70 for backwashing the filters 21, 22, and 23, and flushing the interior of the container 41. The lid 50 is removable, and the filters 20 and discs 30 can be replaced when they become worn or clogged with debris. An ultra-violet light to control algae or a water heater 57 are optionally inserted into the conduit 55.

Although only an exemplary embodiment of the invention has been described in detail above, those skilled in the art will readily appreciate that many modifications are possible without materially departing from the novel teachings and advantages of this invention. For example, the container may be made without a lid, with an access panel on the wall of the container to access the filters and interior devices. Accordingly, all such modifications are intended to be included within the scope of this invention as defined in the following claims.

What is claimed is:

1. A multi-stage filter for clarifying a contaminated fluid comprising:
   a container having a top, a bottom, and sidewalls;
   a fluid inlet operably attached to said container;
   a fluid outlet operably attached to said container;
   a conduit disposed in the container, one end of said conduit being in fluid communication with one of said inlet and outlet;
   a first filter spaced form the sidewalls of said container and surrounding a portion of said conduit having an opening therein, said first filter having a predetermined porosity;
   a second filter spaced from the sidewalls of said container and in juxtaposition to said first filter and surrounding a portion of said conduit, said second filter having a porosity greater than said first filter;
   wherein discs are disposed inside said container such that:
      a bottom disc is smaller in size than the container such that fluid flowing in from the inlet will flow between the outer edge of the bottom disc and the container wall;
      a second disc is spaced above the bottom disc and has the same width and length as the container such that fluid will not pass between the second disc and the container wall, but through openings in the second disc;
      a third disc is spaced above the second disc and is smaller in size than the container such that fluid flowing in from the second disc will flow between the outer edge of the third disc and the container wall;
      a plate is spaced above said third disc and disposed next to the bottom of the conduit; and
      said discs and plate are secured to the bottom of the conduit.

2. The multi-stage filter of claim 1, wherein a third filter spaced from the sidewalls of said container and in juxtaposition to said second filter and surrounding a portion of said conduit, said third filter having a porosity greater than said second filter.

3. The multi-stage filter of claim 1 wherein said filters are disposed in a stack upon each other and contain an interior opening through which said conduit is disposed.

4. The multi-stage filter of claim 1 wherein a pump is attached to said multi-stage filter and operably disposed to draw fluid through said container.

5. The multi-stage filter of claim 1 wherein an ultra-violet light is attached to said multi-stage filter and operably disposed to control the growth of algae in said fluid.

6. The multi-stage filter of claim 1 wherein said filters are constructed from a foam material.

7. The multi-stage filter of claim 1 wherein said discs are constructed from a rigid metallic material.

8. The multi-stage filter of claim 1 wherein said fluid outlet is operably attached to a control valve.

9. The multi-stage filter of claim 1 wherein there is provided a pump that creates a cyclonic flow of fluid in the container through the one way valve.

10. The multi-stage filter of claim 1 wherein said multi-stage filter contains a heater to heat fluid flowing through said container.

11. The multi-stage filter of claim 1 wherein said multi-stage filter contains one or more power cords for connection to an electric power outlet.

12. The multi-stage filter of claim 1 wherein said multi-stage filter contains a back wash valve operably disposed to purge concentrated waste debris from the container.

13. The multi-stage filter of 12 wherein said back wash valve is a knife valve.

14. The multi-stage filter of a claim 1 wherein said container contains a port operably disposed to connect to a garden hose for backwashing the filters.

15. The multi-stage filter of a claim 1 wherein said container contains a lid and an O-Ring is disposed next to the lid of the container for securing the lid to the container.

16. The multi-stage filter of a claim 1 wherein said fluid inlet is operably attached to said container at an angle substantially tangent to the sidewalls of the container such that fluid entering said container flows in a substantially circular manner.

* * * * *